(12) United States Patent
Chang

(10) Patent No.: US 6,382,414 B1
(45) Date of Patent: May 7, 2002

(54) DISC BOX

(75) Inventor: Hsing-Chiou Chang, Chang Hwa Hsien (TW)

(73) Assignee: Snyr Yih Metallic Co., Ltd., Chang Hwa Hsien (TW)

( * ) Notice: Subject to any disclaimer, the term of this patent is extended or adjusted under 35 U.S.C. 154(b) by 0 days.

(21) Appl. No.: 09/802,884

(22) Filed: Mar. 12, 2001

(51) Int. Cl.7 .................................................. B65D 85/57
(52) U.S. Cl. ...................... 206/308.1; 206/310; 206/311
(58) Field of Search ................................. 206/232, 303, 206/307, 308.1, 308.2, 310, 311; 211/40, 41.12

(56) References Cited

U.S. PATENT DOCUMENTS

| | | | | |
|---|---|---|---|---|
| 5,246,107 A | * | 9/1993 | Long et al. ................. | 206/311 |
| 5,477,960 A | * | 12/1995 | Chen ....................... | 206/308.1 |
| 5,634,559 A | * | 6/1997 | Foos et al. ................ | 206/308.1 |
| 5,697,498 A | * | 12/1997 | Weisburn et al. ......... | 206/308.1 |
| 5,715,948 A | * | 2/1998 | Hung ....................... | 206/308.1 |
| 5,746,315 A | * | 5/1998 | Luckow .................... | 206/310 |
| 5,839,576 A | * | 11/1998 | Kim ........................ | 206/308.1 |
| 5,845,771 A | * | 12/1998 | Fu ........................... | 206/308.1 |
| 6,021,894 A | * | 2/2000 | Lakoski et al. .......... | 206/308.1 |
| 6,216,862 B1 | * | 4/2001 | Chang .................... | 206/308.1 |
| 6,227,363 B1 | * | 5/2001 | Lu .......................... | 206/308.1 |

\* cited by examiner

Primary Examiner—Jim Foster
(74) Attorney, Agent, or Firm—Rosenberg, Klein & Lee

(57) ABSTRACT

A disc box comprises a first box body and a second box body connected with one side of the first box body by a resilient connecting strip. A peripheral frame is upwardly and downwardly disposed along the other three sides of each the first box body and the second box body. A front face of the peripheral frame is formed with an inward recess. A pairs of holes corresponding to each other are formed on respective sides of the first box body and the second box body, respectively. The center portions of two sides of the first box body are formed with a male clip and a female clip, while the center portions of two sides of the second box body are also formed a female clip and a male clip.

4 Claims, 13 Drawing Sheets

DISC BOX

FIELD OF THE INVENTION

This invention relates to a disc box, more particularly to a disc box which is able to hold two discs in a first box body and a second box body, separately.

BACKGROUND OF THE INVENTION

A conventional disc box includes a box body and a cover body pivotally connected with one side of the box body. The center of the box body is disposed with a clip to secure a disc therein. However, this design can hold only one disc, and which can not be stacked together.

In view of this, the inventor has invented the present invention to improve the above mentioned shortcoming and many others.

SUMMARY OF THE INVENTION

It is the primary object of the present invention to provide a disc box, which may store two discs in one box and the box is able to be stacked with each other to save space.

It is another object of the present invention to provide a disc box, which can be stacked together or be separated.

It is a further object of the present invention to provide a disc box, which is easy to open and close the box.

DETAILED DESCRIPTION OF THE PREFERRED EMBODIMENTS

Figure 1:
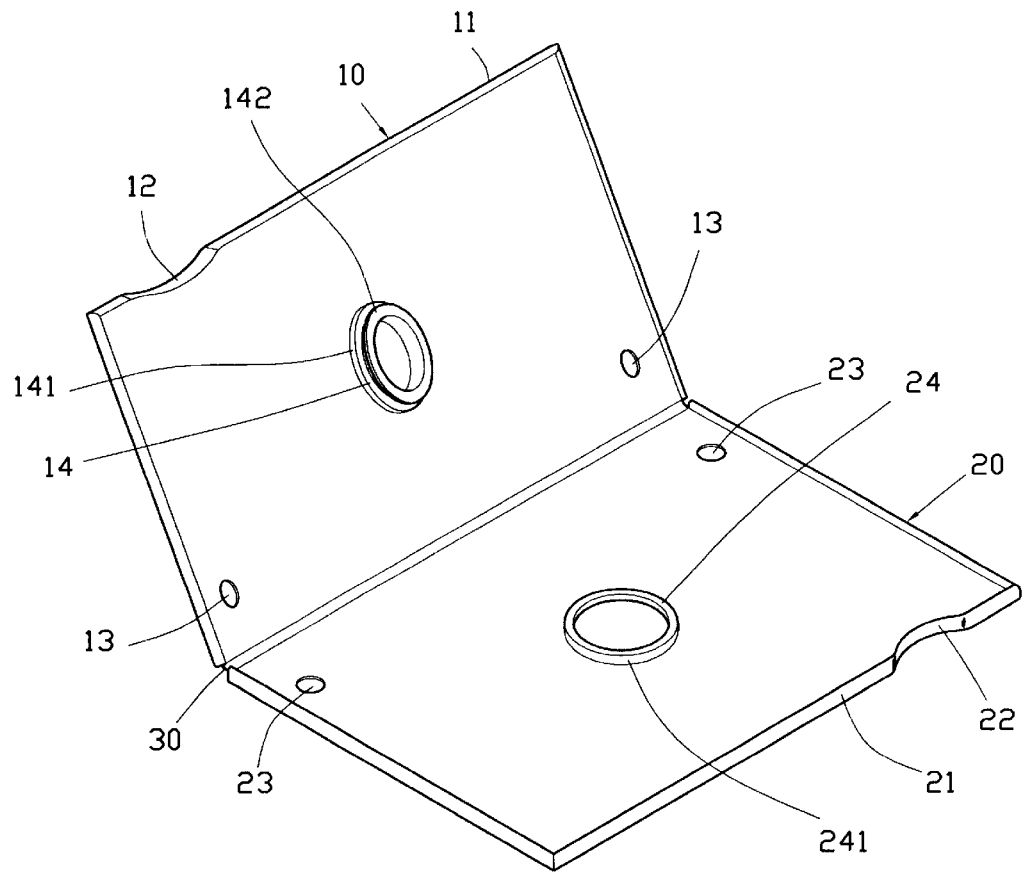
FIG. 1 is a perspective view of the present invention.
Figure 1A:
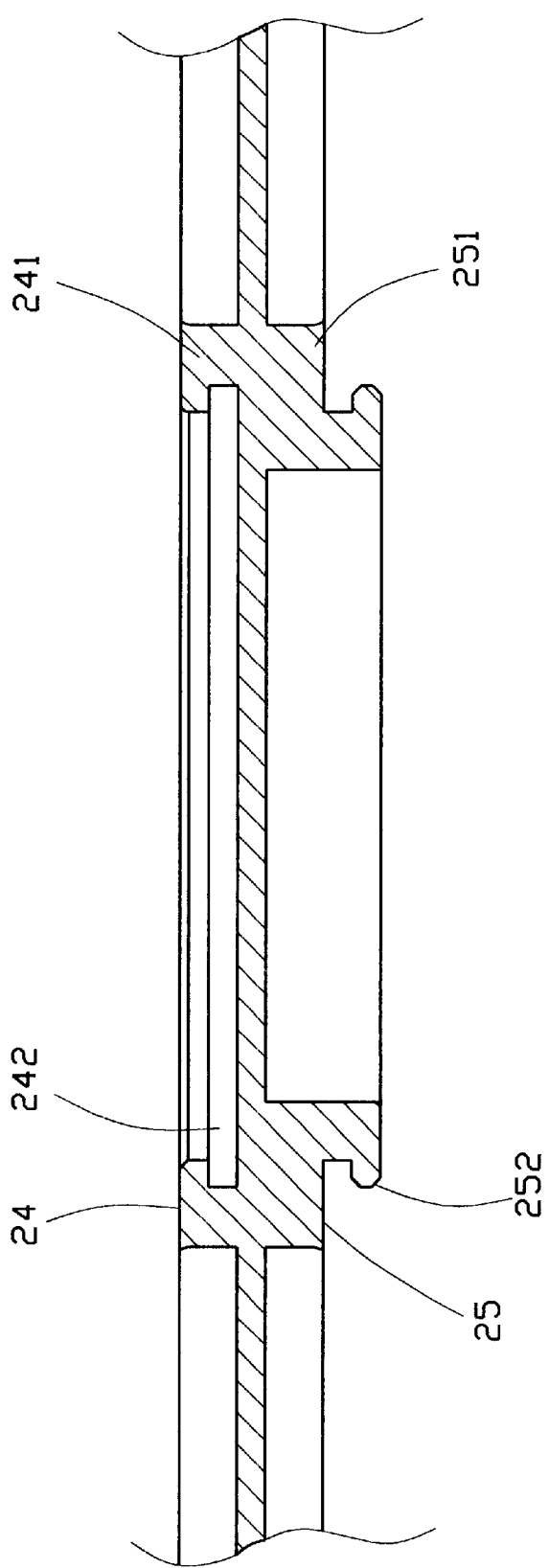
FIG. 1A is an enlarged view of a male clip and a female clip of the second box body.
Figure 1B:
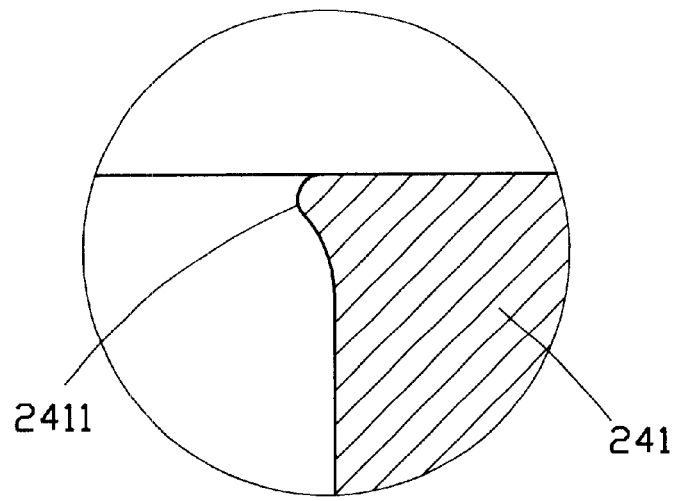
FIG. 1B is an enlarged view of a ledge on a female clip of the second box body.
Figure 1C:
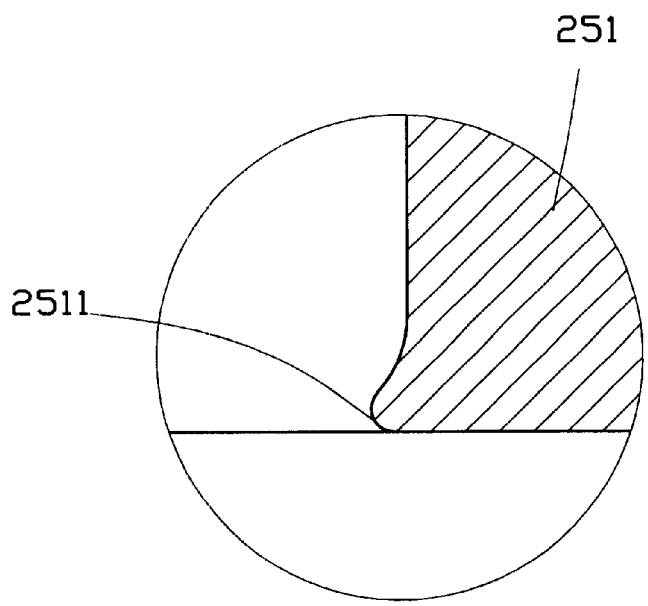
FIG. 1C is an enlarged view of a ledge on a male clip of the second box body.
Figure 1D:
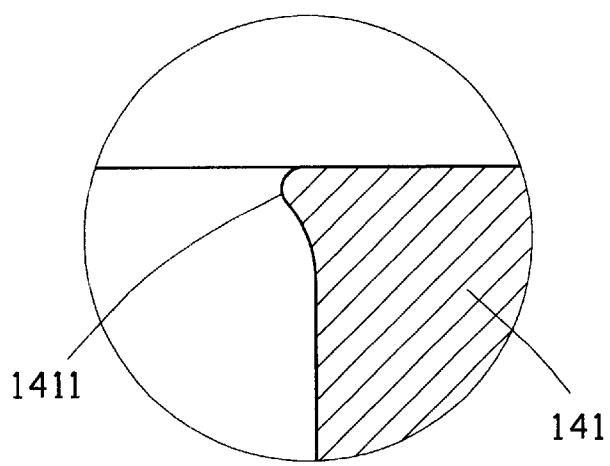
FIG. 1D is an enlarged view of a ledge on a male clip of the first box body.
Figure 1E:
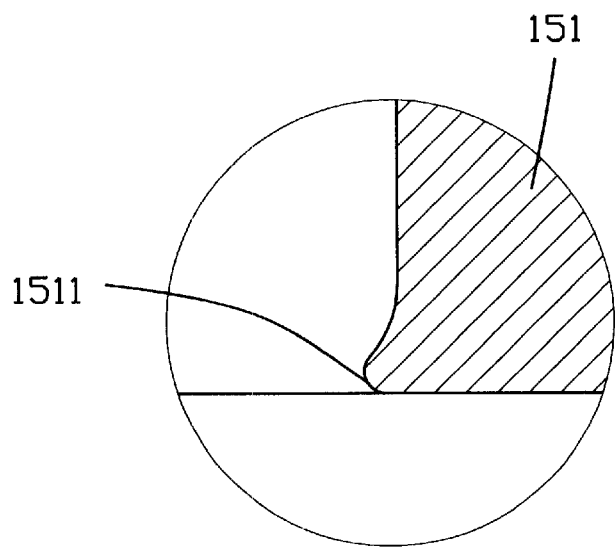
FIG. 1E is an enlarged view of a ledge on a female clip of the first box body.
Figure 1F:
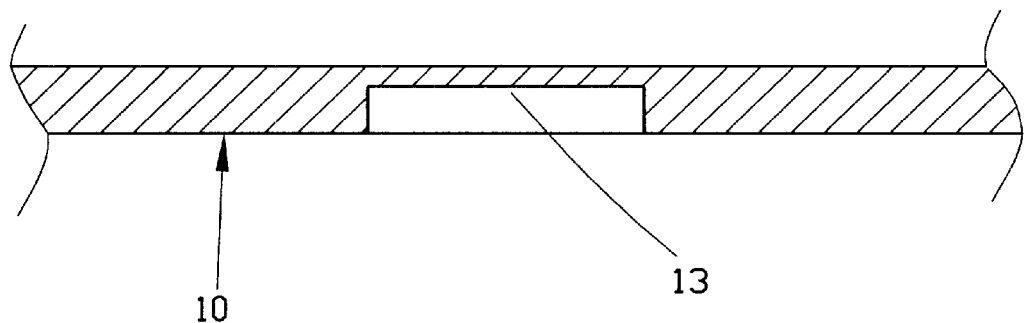
FIG. 1F is an enlarged view of a hole of the first box body.
Figure 1G:
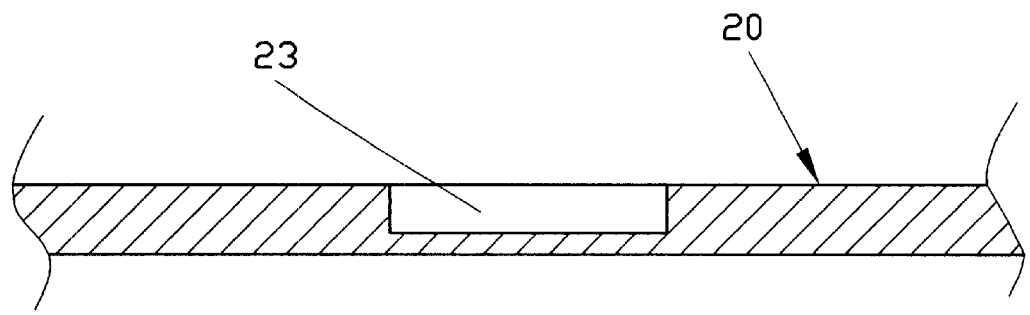
FIG. 1G is an enlarged view of a hole of the second box body.
Figure 2:
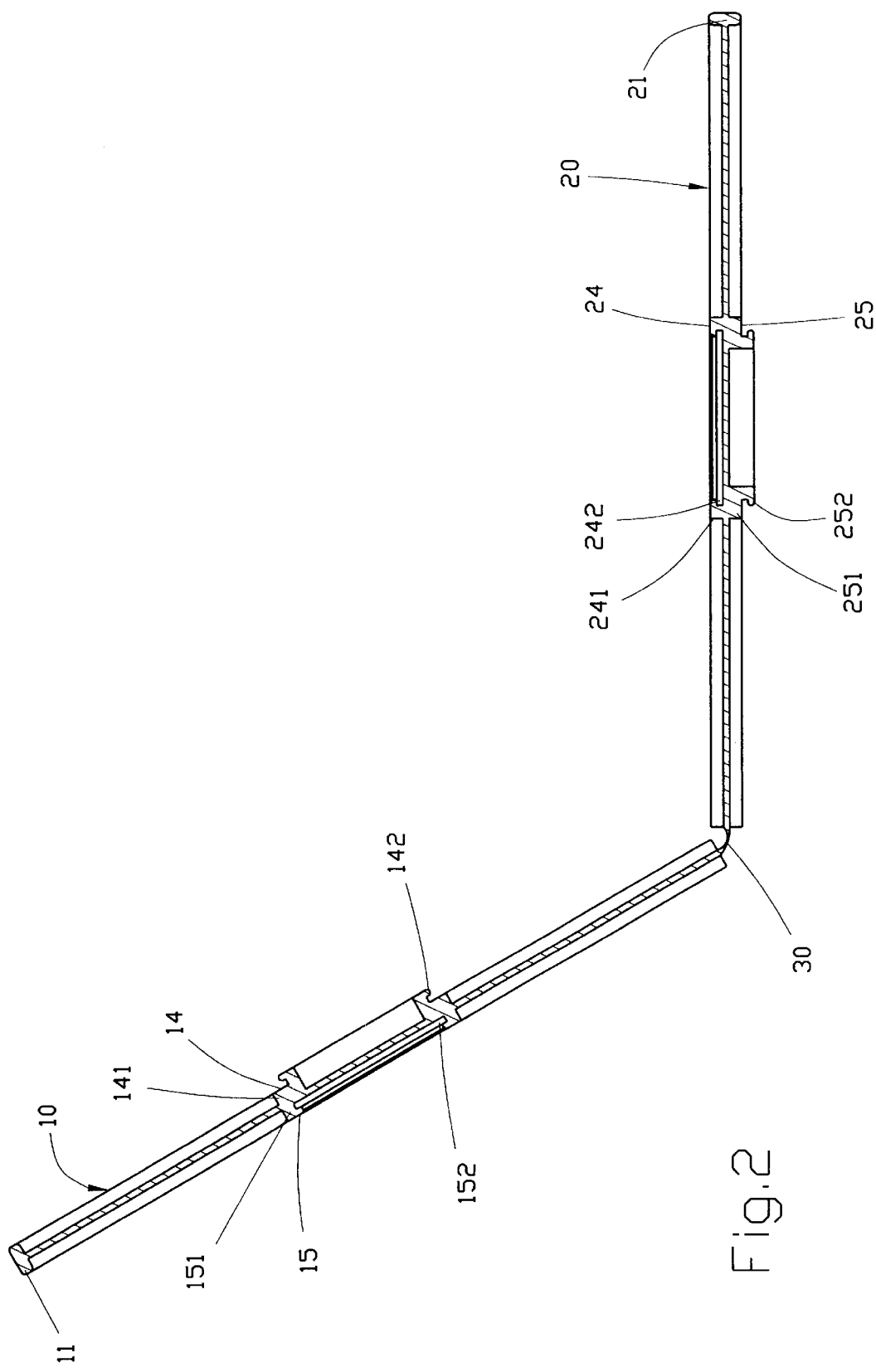
FIG. 2 is a side view of the present invention.
Figure 2A:
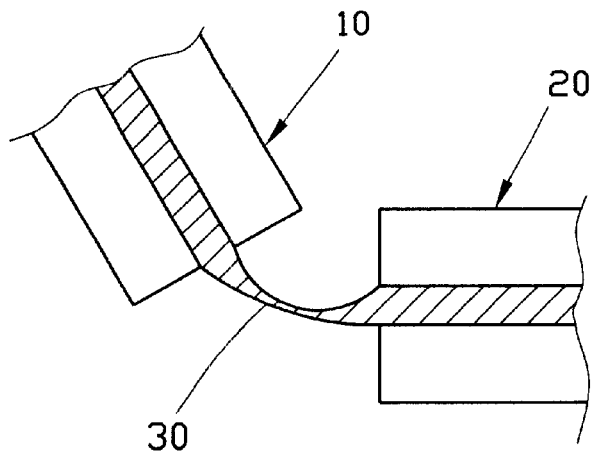
FIG. 2A is an enlarged view of a resilient connecting strip of the present invention.
Figure 2B:
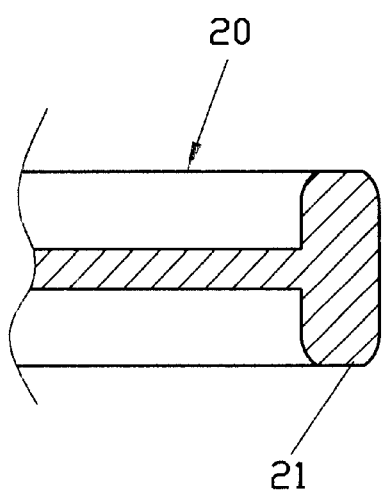
FIG. 2B is an enlarged side view of a peripheral frame of the present invention.

FIGS. 1, 1A, 1B, 1C, 1D, 1E, 1F, 1G, and FIGS. 2, 2A and 2B show a disc box of the present invention, which comprises a first box body 10 and a second box body 20 connected with one side of the first box body 10 by a resilient connecting strip 30. A peripheral frame 11 is upwardly and downwardly disposed along the other three sides of the first box body 10. A peripheral frame 21 is disposed along the other three sides of the second box body 20. A lower section of a front face of the peripheral frame 11 is formed with an inward recess 12. An upper section of a front face of the peripheral frame 21 is formed with an inward recess 22. Two pairs of holes 13 and 23 corresponding to each other are formed on respective sides of the first box body 10 and the second box body 20, which have reserved with a thickness for a simple insertion. The center portions of two sides of the first box body 10 are formed with a male clip 14 and a female clip 15, while the center portions of two sides of the second box body 20 are also formed a female clip 24 and a male clip 25 corresponding to the male clip 14 and the female clip 14 of the first box body 10. Each of the male clips 14 and 25 is provided with a ring 141 and 151 having an inner edge bulge upwardly to form a hook 142 and 252. Each top end of the rings 141 and 151 has a ledge 1411 and 2511 thereat. Each of the female clips 15 and 24 is also provided with a ring 151 and 241 having a snap trough 152 and 242 from the inner edge of each ring. Each top end of the rings 151 and 241 also has a ledge 1511 and 2411.

Figure 3:
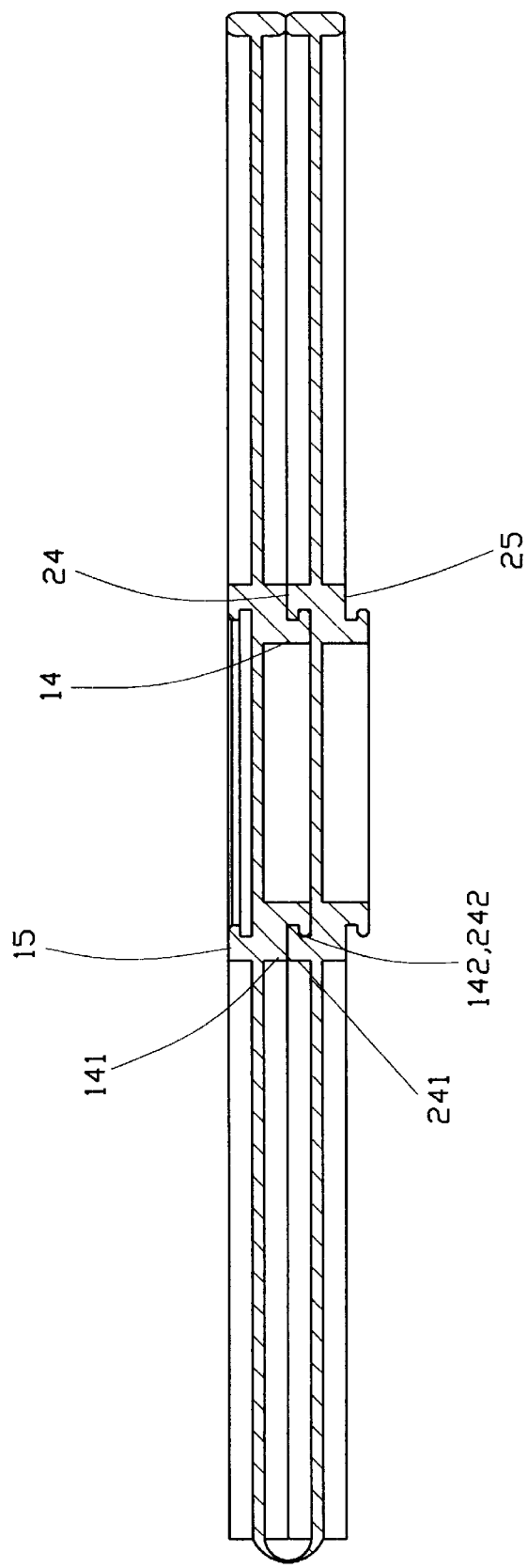
FIG. 3 is a side cross sectional view of an empty disc box.
Figure 4:
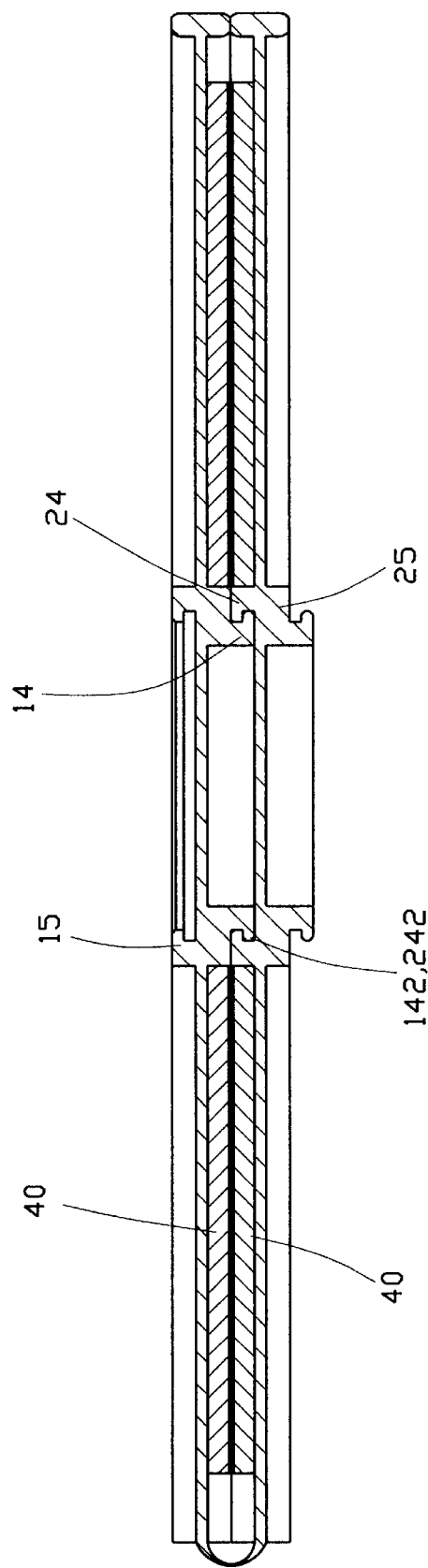
FIG. 4 is a side cross sectional view showing a pair of discs secured in the disc box.
Figure 4A:
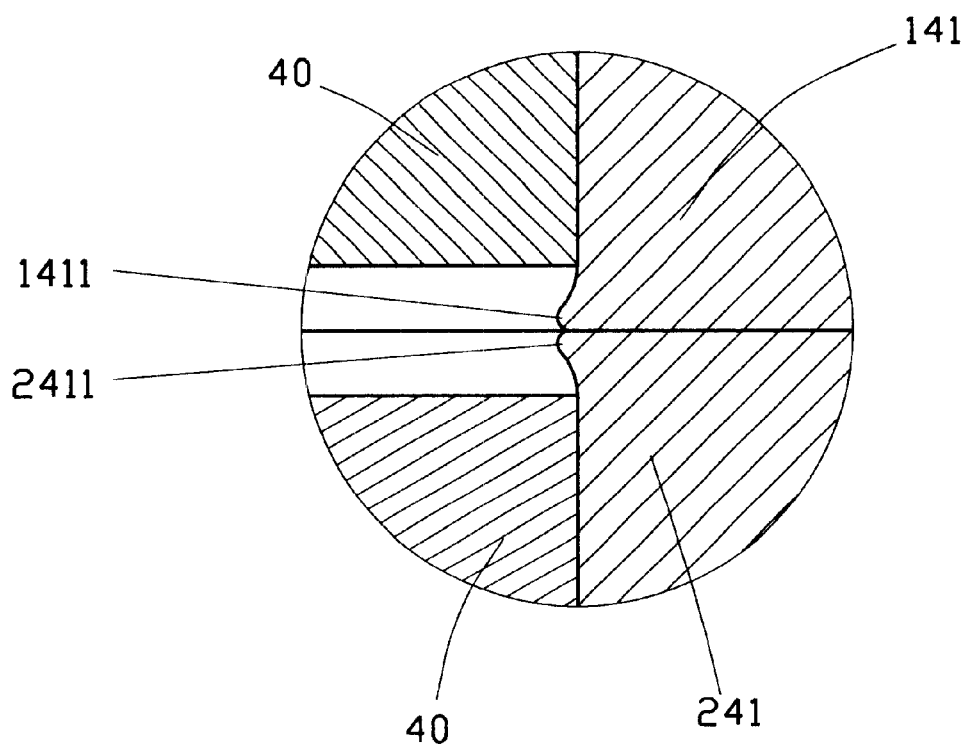
FIG. 4A is an enlarged view showing a disc in a clipped status.

As shown in FIGS. 3, 4 and 4A, the rings 141, 251, 151 and 241 of the male clips 14 and 25 and the female clips 15 and 24 of the first box body 10 and the second box body 20 are able to clip the center hole of each disc 40. As shown in FIG. 4A, with the upper enlarged portions of each rings to secure the compact disc 40 at place, as shown in FIG. 4A, the ledges 1411 and 2411 on the top ends of the rings 141 and 241 are formed as clips of the holes, whereas the ledges 1511 and 2511 on top ends of the rings 151 and 251 are the same function. This design also allows the first box body 10 and the second box body 20 to be closed in an appropriate direction of demand. By engaging the hook 142 of the male clip 14 of the first box body 10 to the snap trough 242 of the female clip 24 of the second box body 20, or by engaging the hook 252 of the male clip 25 of the second box body 20 to the snap trough 152 of the female clip 15 of the first box body 10.

Figure 5:
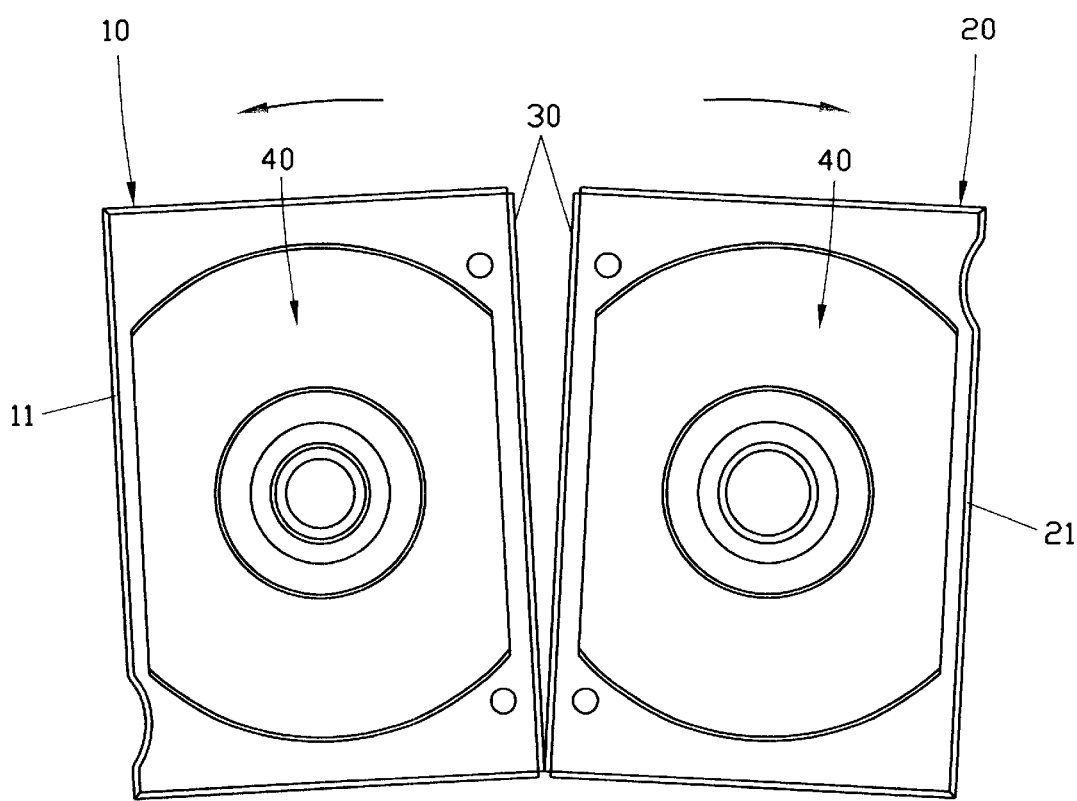
FIG. 5 is a top view showing a separated first box body and a second box body.
Figure 6:
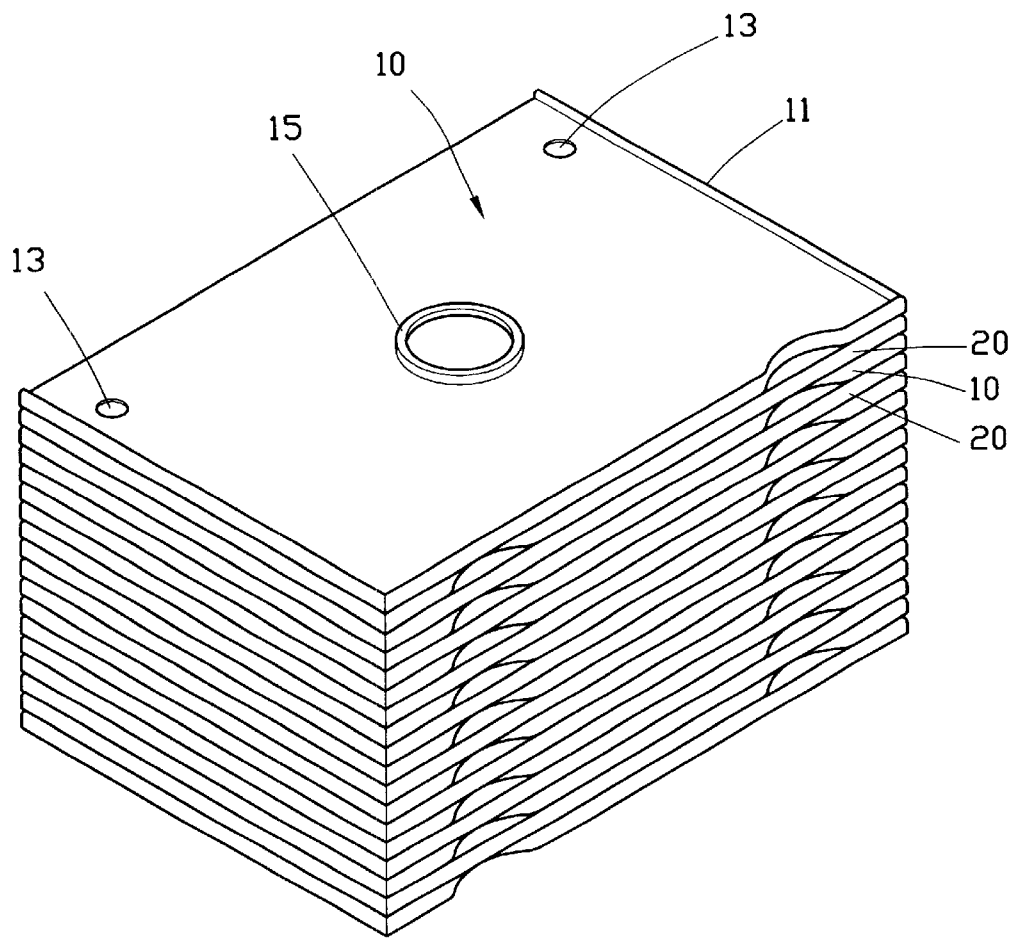
FIG. 6 is a perspective view of several disc boxes stacked together.

As shown in FIG. 5, the first box body 10 and the second box body 20 are connected by a resilient connecting strip 30 which may be tore apart and use as a single disc box.

Figure 7:
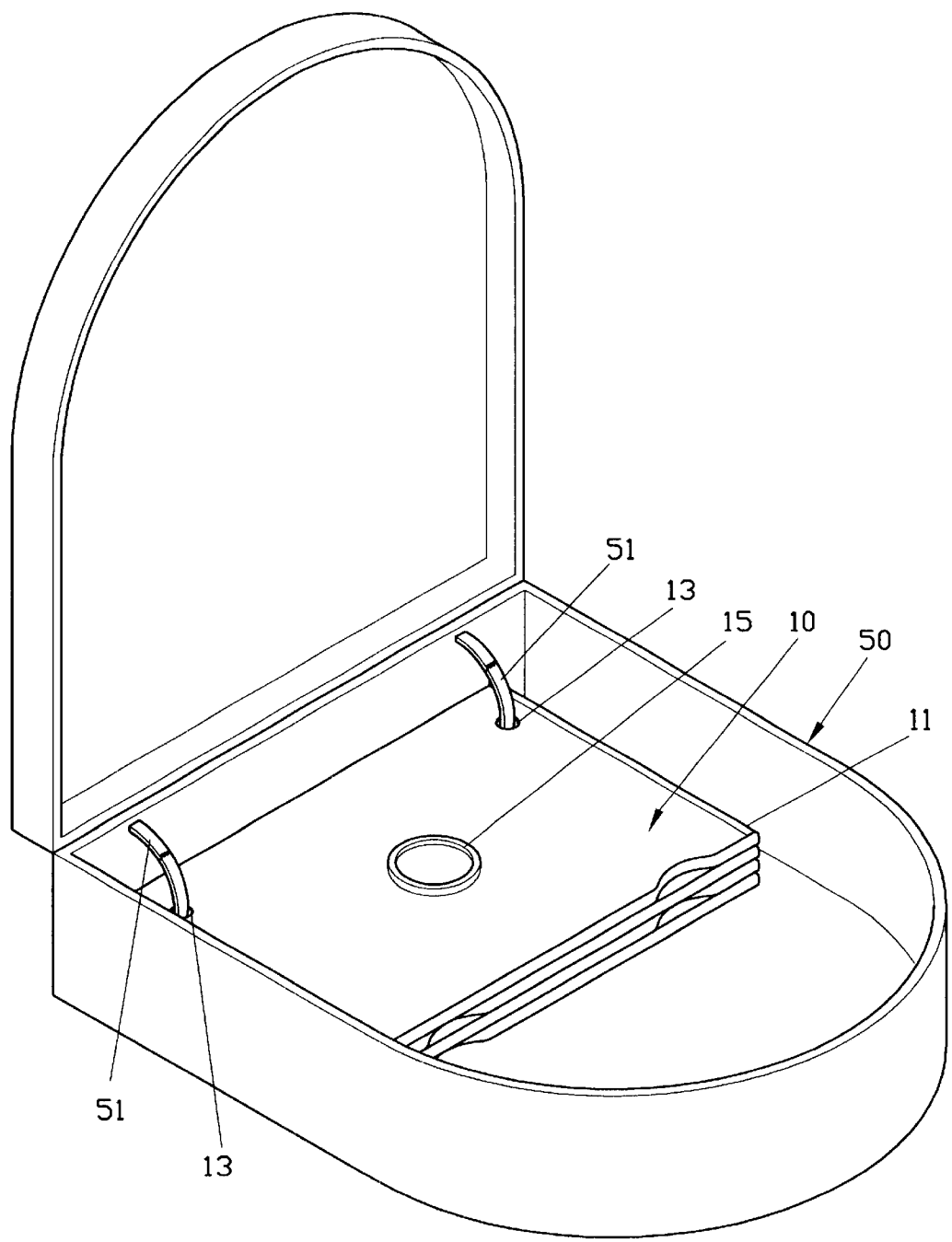
FIG. 7 is a perspective view of the stacked disc boxes placed in a disc tray.

By engaging the hook 252 of the male clip 25 of the second box body 20 to the snap trough 152 of the female clip 15 of the first box body 10, the disc boxes are stacked together, that is convenient to carry and store. As shown in FIG. 7, the holes 13 and 23 of the first box body 10 and the second box body 20 may be sleeved onto a hook 51 of a tray 50.

With the above description, it is understood that the new invention has the following advantages:

1. Both of the first box body 10 and the second box body 20 may hold a disc 40 and upon the disc box is closed, it may be easily stacked with each other to save the storage space.
2. The first box body 10 and the second box body 20 are connected by a resilient connecting strip 30 which may easily be tore apart.
3. The corresponding holes 13 and 23 at the respective sides of the first box body 10 and the second box body 20 are for a hook 51 of a tray 50 to insert therein to secure together. The inward recesses 12 and 22 of the first box body 10 and the second box body 20 are designed to facilitate the opening of the disc box.

While there has been described and illustrated one specific embodiment of the invention, it will be clear that variations in the details of the embodiment specifically illustrated and described may be made without departing from the true spirit and scope of the invention as defined in the appended claims.

I claim:

1. A disc box comprising a first box body and a second box body, said first box body and the second box body being connected with a resilient connecting strip which may be torn apart to form a pair of individual disc boxes, a peripheral frame being upwardly and downwardly disposed along the other three sides of the first box body and the second box body, a male clip and a female clip being formed on the center portion of two sides of said first box body, a male clip and a female clip being formed on the center portion of two sides of said second box body, wherein each said male clip being provided with a ring having an inner edge bulge upwardly to form a hook, and on a top end of said ring having a ledge thereat, each said female clip being provided with a ring having a snap trough from its inner edge, on a top end of said ring having a ledge thereof.

2. The disc box as recited in claim 1, wherein said first box body and said second box body comprises a pair of holes at bottom respective sides thereof and having reserved with a thickness for a hook of a tray to insert there through.

3. A disc box comprising a first box body and a second box body, said first box body comprising a male clip at center portion of one side thereof, said second box body comprising a female clip at center portion of one side thereof corresponding to said male clip of said first box body, wherein said male clip being provided with a ring having an inner edge bulge upwardly to form a hook, and on a top end of said ring having a ledge thereat, said female clip being provided with a ring having a snap trough from its inner edge, on a top end of said ring having a ledge thereof.

4. A disc box having the front and the two sides extending upwardly and downwardly to form a peripheral frame, at center portions of the respective sides of said box body being formed with a male clip and a female clip, wherein said male clip being provided with a ring having an inner edge bulge upwardly to form a hook, and on a top end of said ring having a ledge thereat, said female clip being provided with a ring having a snap trough from its inner edge, on a top end of said ring having a ledge thereof.

* * * * *